(12) United States Patent
Toppinen et al.

(10) Patent No.: US 12,370,508 B2
(45) Date of Patent: Jul. 29, 2025

(54) FLUID MIXER AND A METHOD FOR MIXING FLUIDS

(71) Applicant: Neste Oyj, Espoo (FI)

(72) Inventors: Sami Toppinen, Porvoo (FI); Johanna Vaittinen, Porvoo (FI); Ari Vepsäläinen, Porvoo (FI)

(73) Assignee: NESTE OYJ, Espoo (FI)

( * ) Notice: Subject to any disclaimer, the term of this patent is extended or adjusted under 35 U.S.C. 154(b) by 963 days.

(21) Appl. No.: 17/427,482

(22) PCT Filed: Feb. 5, 2020

(86) PCT No.: PCT/FI2020/050070
§ 371 (c)(1),
(2) Date: Jul. 30, 2021

(87) PCT Pub. No.: WO2020/165496
PCT Pub. Date: Aug. 20, 2020

(65) Prior Publication Data
US 2022/0008873 A1 Jan. 13, 2022

(30) Foreign Application Priority Data
Feb. 14, 2019 (FI) .................... 20195113

(51) Int. Cl.
*B01F 5/00* (2006.01)
*B01F 25/10* (2022.01)
(Continued)

(52) U.S. Cl.
CPC ........ *B01F 25/1042* (2022.01); *B01F 25/101* (2022.01); *B01J 8/0453* (2013.01);
(Continued)

(58) Field of Classification Search
CPC .. B01F 25/10; B01F 25/101; B01F 2025/914; B01F 23/2322
See application file for complete search history.

(56) References Cited

U.S. PATENT DOCUMENTS 3,723,300 A 3/1973 Carson et al.
5,403,560 A 4/1995 Deshpande et al.
(Continued)

FOREIGN PATENT DOCUMENTS

CA 2 462 230 A1 11/1994
CN 105169982 A 12/2015
(Continued)

OTHER PUBLICATIONS

Office Action (Opinion on Patentability) issued on Mar. 30, 2022, by the Finnish Patent Office in corresponding Finnish Patent Application No. 20195113. (5 pages).
(Continued)

*Primary Examiner* — Elizabeth Insler
(74) *Attorney, Agent, or Firm* — Buchanan Ingersoll & Rooney PC

(57) ABSTRACT

A fluid mixer for a reactor of a hydrocarbon processing plant includes a substantially cylindrical mixing chamber, at least one first inlet for conducting first fluid to the mixing chamber from above the mixing chamber and along a side wall of the mixing chamber to produce a spiral stream in the mixing chamber, at least one second inlet for conducting second fluid tangentially into the spiral stream, and an outlet channel for conducting the first and second fluids downwards out from the mixing chamber. The outlet channel is concentric to the mixing chamber and includes a mixing structure for enhancing mixing of the first and second fluids. At least a part of the mixing structure is located below an upper edge
(Continued)

of the outlet channel and produces turbulence in a stream of the first and second fluids flowing in the outlet channel.

18 Claims, 6 Drawing Sheets

(51) Int. Cl.
  *B01J 8/04* (2006.01)
  *B01J 19/24* (2006.01)
  *C10G 49/00* (2006.01)

(52) U.S. Cl.
  CPC ......... *B01J 8/0492* (2013.01); *B01J 19/2405* (2013.01); *B01J 2208/00831* (2013.01); *B01J 2208/00929* (2013.01); *C10G 49/002* (2013.01)

(56) References Cited

U.S. PATENT DOCUMENTS

| | | | |
|---|---|---|---|
| 5,554,346 A | 9/1996 | Perry et al. | |
| 5,567,396 A * | 10/1996 | Perry | C10G 49/002 422/607 |
| 6,098,965 A | 8/2000 | Jacobs et al. | |
| 6,338,828 B1 | 1/2002 | Stupin et al. | |
| 6,508,459 B1 * | 1/2003 | Jacobs | B01F 25/4316 261/114.2 |
| 8,440,875 B1 | 5/2013 | Eizenga | |
| 9,403,139 B2 * | 8/2016 | Muller | C10G 49/002 |
| 2002/0039547 A1 | 4/2002 | Nelson et al. | |
| 2005/0163682 A1 | 7/2005 | Jacobs et al. | |
| 2013/0064740 A1 | 3/2013 | Boyak et al. | |
| 2015/0110686 A1 | 4/2015 | Cheng et al. | |
| 2015/0360189 A1 | 12/2015 | Riska et al. | |
| 2019/0105627 A1 | 4/2019 | Xu et al. | |
| 2022/0008873 A1 | 1/2022 | Toppinen et al. | |

FOREIGN PATENT DOCUMENTS

| | | |
|---|---|---|
| EP | 2767333 A1 | 8/2014 |
| EP | 2954945 A1 | 12/2015 |
| GB | 2277888 A | 11/1994 |
| WO | 0024505 A1 | 5/2000 |
| WO | 2014121816 A1 | 8/2014 |
| WO | 2019023317 A1 | 1/2019 |
| WO | 2020165496 A1 | 8/2020 |

OTHER PUBLICATIONS

Office Action issued on May 12, 2022, by the Singaporean Patent Office in corresponding Singaporean Patent Application No. 11202107691V. (7 pages).

Office Action issued on Mar. 29, 2023, by the Canadian Patent Office in corresponding Canadian Patent Application No. 3,125,884. (4 pages).

International Search Report (PCT/ISA/210) with translation and Written Opinion (PCT/ISA/237) mailed on May 8, 2020, by the European Patent Office as the International Searching Authority for International Application No. PCT/FI2020/050070.

Office Action (Notification of the First Office Action) issued Mar. 25, 2023, by the National Intellectual Property Administration, P. R. China in corresponding Chinese Patent Application No. 202080014315.5 and an English translation of the Office Action. (16 pages).

* cited by examiner

Magnification and section

FLUID MIXER AND A METHOD FOR MIXING FLUIDS

FIELD OF THE DISCLOSURE

The disclosure relates generally to a reactor of a hydrocarbon processing plant e.g. a petroleum refinery. The reactor can be, for example but not necessarily, a hydrodeoxygenation "HDO" reactor. More particularly, the disclosure relates to a fluid mixer for a reactor. Furthermore, the disclosure relates to a method for mixing fluids in a reactor.

BACKGROUND

Many catalytic processes are carried out in reactors which comprise catalytic beds and one or more fluid mixers each being disposed between successive catalytic beds. A fluid mixer is configured to mix first fluid coming out from a catalytic bed with second fluid fed to the fluid mixer, and to conduct the mixture of the first and second fluids to a next catalytic bed. A catalytic process can be for example hydrodeoxygenation "HDO" that removes oxygen from organic oxygen compounds as water, hydrodesulphurization "HDS" that removes sulfur from organic sulfur compounds as dihydrogensulfide $H_2S$, hydrodenitrogenation "HDN" that removes nitrogen from organic nitrogen compounds as ammonia $NH_3$, or hydrodechlorination "HDCl" that removes halogens e.g. chlorine from organic chloride compounds as hydrochloric acid HCl. For example, the hydrodeoxygenation "HDO" is suitable for upgrading plant oils and fats, as well as animal oils and fats, that normally contain too much oxygen to be considered diesel range hydrocarbons.

Plant oils and fats as well as animal oils and fats typically contain free fatty acids "FFA" that are very corrosive because of their acidity. Thus, free fatty acids may cause corrosion on equipment used in processes involving them, such as piping and reactors. Furthermore, free fatty acids may cause undesirable side reactions such as for example formation of harmful heavy molecular weight compounds, oligomerization, polymerization, cyclisation, aromatization, and/or cracking reactions. Therefore, when feedstock with high levels of free fatty acids and/or other organic acids is used, the equipment must be protected from corrosion. For example, in conjunction with the hydrodeoxygenation "HDO", first fluid that trickles down through a catalytic bed to a fluid mixer has a level of free fatty acids significantly lower than that of second fluid that is fed to the reactor via the fluid mixer. Thus, material surfaces which are in contact with the second fluid or with a mixture of the first and second fluids so that the local concentration of the second fluid is too high are exposed to corrosion. Corrosion prevention can be achieved by coating the exposed surfaces, adding corrosion inhibitors and/or anti-corrosion agents, and/or using corrosion resistant materials in the exposed surfaces. These corrosion prevention techniques are however not free from challenges relating to costs and/or complexity of usage. For example, U.S. Pat. No. 8,440,875 describes a method for making diesel fuel from renewable feedstock. Ammonia or amine compound is used to neutralize organic acids in the renewable feedstock. The ammonia or amine compound needs to be however removed from a product mixture before an isomerization zone to prevent the ammonia or amine compound from affecting an isomerization catalyst in an undesired way.

SUMMARY

The following presents a simplified summary in order to provide a basic understanding of some embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new fluid mixer for a reactor of a hydrocarbon processing plant, e.g. a petroleum refinery. The reactor can be for example a hydrotreatment reactor such as e.g. a hydrodeoxygenation "HDO" reactor, a hydrodesulphurization "HDS" reactor, a hydrodenitrogenation "HDN" reactor, or a hydrodechlorination "HDCl" reactor. The fluid mixer is suitable for e.g. downflow-type reactors, especially trickle-bed reactors.

A fluid mixer according to the invention comprises:
  a frame structure defining a mixing chamber and at least
    one first inlet for conducting first fluid to the mixing
    chamber from above the mixing chamber, the mixing
    chamber being substantially cylindrical and the first
    inlet being shaped to conduct the first fluid along a side
    wall of the mixing chamber to produce a spiral stream
    in the mixing chamber,
  at least one second inlet for conducting second fluid
    tangentially into the spiral stream, each opening of the
    second inlet being inside the mixing chamber and a
    distance away from the side wall of the mixing chamber to reduce concentration of the second fluid at the
    side wall of the mixing chamber, and
  an outlet channel for conducting the first and second fluids
    downwards out from the mixing chamber, the outlet
    channel being concentric to the mixing chamber.

The outlet channel comprises a mixing structure that is located at least partly below an upper edge of the outlet channel and is suitable for producing turbulence in a stream of the first and second fluids flowing in the outlet channel. The mixing structure enhances mixing of the first and second fluids and thereby reduces local concentration maxima of the second fluid in the mixture of the first and second fluids. This reduces a corrosion risk of material surfaces that are in contact with the mixture of the first and second fluids coming out from the fluid mixer.

In accordance with the invention, there is provided also a new reactor for a hydrocarbon processing plant. The reactor comprises:
  a reactor vessel,
  catalytic beds inside the reactor vessel, and
  at least one fluid mixer according to the invention inside
    the reactor vessel and between successive ones of the
    catalytic beds.

In accordance with the invention, there is provided also a new method for mixing fluids in a reactor of a hydrocarbon processing plant. The method comprises:
  conducting first fluid, via at least one first inlet, to a
    mixing chamber from above the mixing chamber, the
    mixing chamber being substantially cylindrical and the
    first fluid being conducted along a side wall of the
    mixing chamber to produce a spiral stream in the
    mixing chamber, conducting second fluid, via at least one second inlet, tangentially into the spiral stream, each opening of the second inlet being inside the mixing chamber and a distance away from the side wall of the mixing chamber to reduce concentration of the second fluid at the side wall of the mixing chamber, and conducting, via an outlet channel concentric to the mixing chamber, the first and second fluids downwards out from the mixing chamber, wherein the outlet channel comprises a mixing structure located at least partly below an upper edge of the outlet channel and producing turbulence in a stream of the first and second fluids flowing in the outlet channel.

Exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does as such not exclude a plurality.

BRIEF DESCRIPTION OF THE FIGURES

Exemplifying and non-limiting embodiments of the invention and their advantages are explained in greater details below in the sense of examples and with reference to the accompanying drawings, in which.

DESCRIPTION OF EXEMPLIFYING EMBODIMENTS

The specific examples provided in the description below should not be construed as limiting the scope and/or the applicability of the accompanied claims. Lists and groups of examples provided in the description are not exhaustive unless otherwise explicitly stated.

Figure 1:
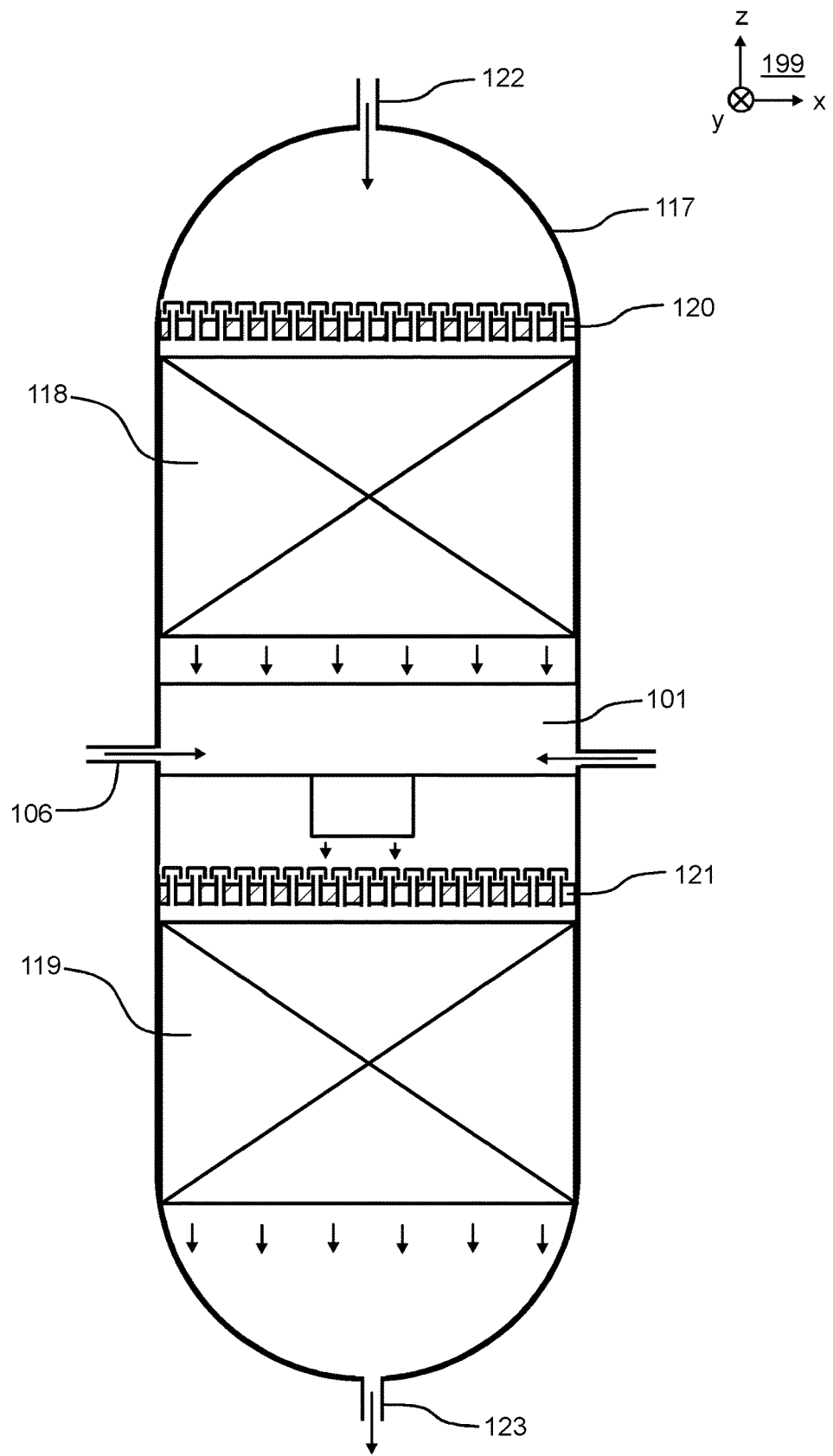
FIG. 1 illustrates a reactor that comprises a fluid mixer according to an exemplifying and non-limiting embodiment.

FIG. 1 shows a schematic section view of a reactor that comprises a fluid mixer 101 according to an exemplifying and non-limiting embodiment. The section plane is parallel with the xz-plane of a coordinate system 199. The reactor can be for example a hydrotreatment reactor such as e.g. a hydrodeoxygenation "HDO" reactor, a hydrodesulphurization "HDS" reactor, a hydrodenitrogenation "HDN" reactor, or a hydrodechlorination "HDCl" reactor. The reactor comprises a reactor vessel 117 that contains a first catalyst bed 118 and a second catalyst bed 119. The reactor comprises an inlet pipe 122 for receiving first fluid that enters a distribution tray 120 that distributes the first fluid evenly over the cross section of the first catalyst bed 118. The fluid mixer 101 is located below the first catalyst bed 118 and thus the fluid mixer 101 receives the first fluid that is processed within the first catalyst bed 118 and trickles through the first catalyst bed 118. The reactor comprises an inlet pipe 106 through which second fluid is fed to the fluid mixer 101. The first and second fluids are mixed in the fluid mixer 101 and the mixture of the first and second fluids enters a distribution tray 121 that distributes the mixture of the first and second fluids evenly over the cross section of the second catalyst bed 119. The reactor comprises an outlet pipe 123 through which product of the treatment process exits the reactor. In an exemplifying case where the reactor is a hydrodeoxygenation "HDO" reactor, the first fluid fed to the inlet pipe 122 may comprise a mixture of fresh feed substances and the product of the hydrodeoxygenation process so that a part of a material flow coming out from the outlet pipe 123 is fed back to the inlet pipe 122. The fresh feed substances may comprise e.g. plant oils, plant fats, animal oils, and/or animal fats. The second fluid that is fed to the inlet pipe 106 may comprise the fresh feed substances. The second fluid may also act as temperature control medium with the aid of which the temperature of the treatment process can be controlled at least partly. More than two catalyst beds may also be used so that there is a fluid mixer between successive ones of the catalyst beds. The number of fluid mixers is typically N−1 where N is the number of catalyst beds.

Figure 2A:
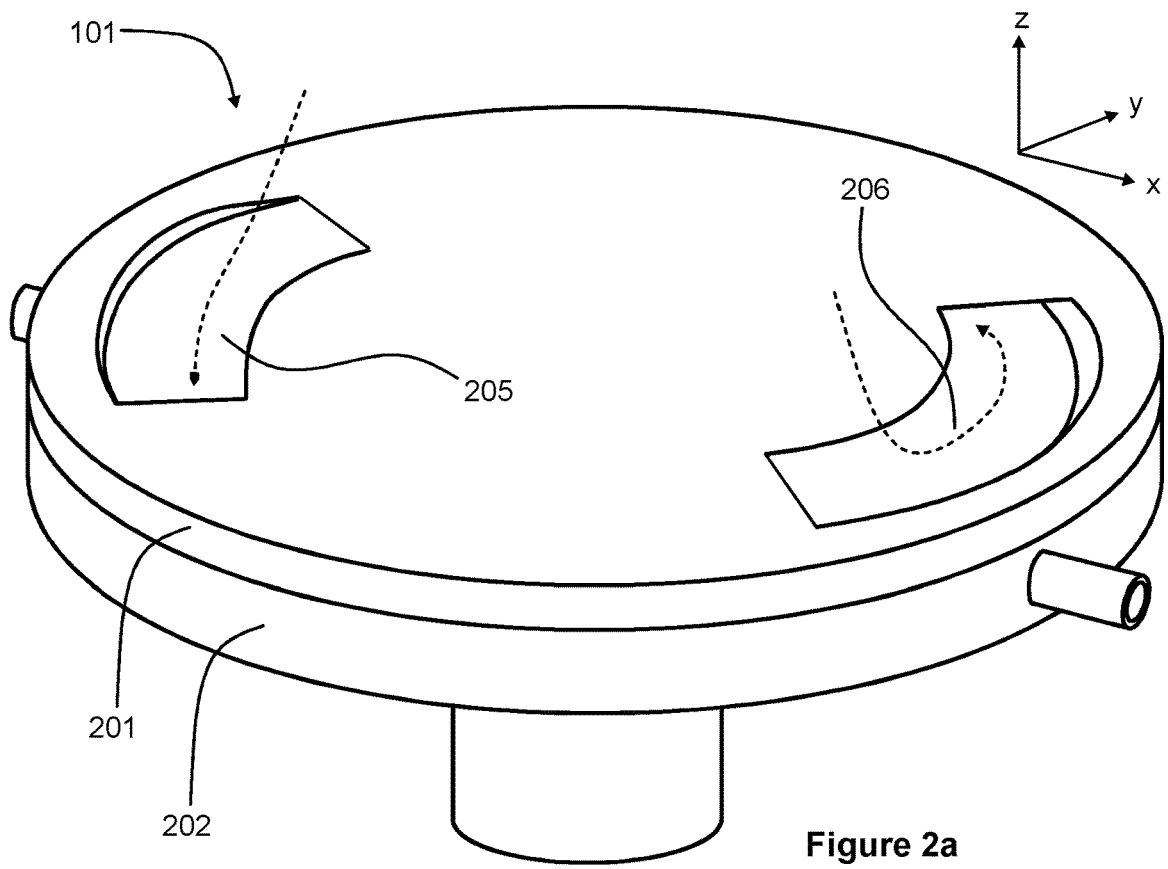
FIGS. 2a and 2b illustrate a fluid mixer according to an exemplifying and non-limiting embodiment.
Figure 2B:
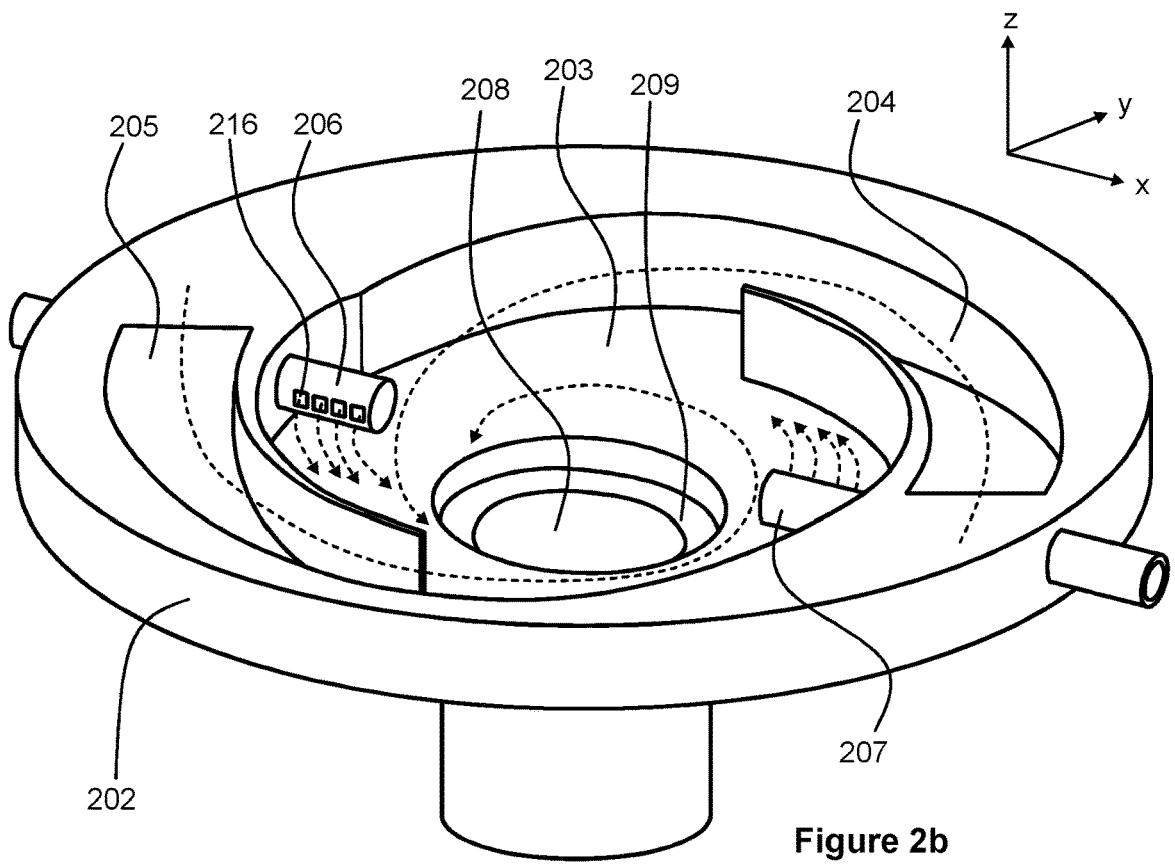

The fluid mixer 101 is illustrated in more details in FIGS. 2a and 2b. In this exemplifying case, the fluid mixer 101 comprises a frame structure that has an upper section 201 and a lower section 202. FIG. 2b shows the fluid mixer without the upper section 201. The frame structure defines a mixing chamber 203 and first inlets 204 and 205 for conducting the first fluid to the mixing chamber 203 from above the mixing chamber 203. As shown in FIG. 2b, the mixing chamber 203 is substantially cylindrical and the first inlets 204 and 205 are shaped to conduct the first fluid along a side wall of the mixing chamber 203 to produce a spiral stream in the mixing chamber 203. In this exemplifying case, the first inlets 204 and 205 are placed equidistantly on the periphery of the mixing chamber 203 so that the first inlets 204 and 205 are on opposite sides of the mixing chamber 203. The fluid mixer comprises second inlets 206 and 207 for conducting the second fluid tangentially into the spiral stream. The second inlets 206 and 297 are connected to inlet pipes shown in FIG. 1 so that e.g. the second inlet 206 is connected to the inlet pipe 106. As illustrated in FIG. 2b, each opening of the second inlets is a distance away from the side wall of the mixing chamber 203 to reduce concentration of the second fluid at the side wall of the mixing chamber. In FIG. 2b, one of the openings of the second inlets is denoted with a reference 216. In this exemplifying fluid mixer, the second inlets 206 and 207 are placed equidistantly on the periphery of the mixing chamber 203 so that the second inlets 206 and 207 are on opposite sides of the mixing chamber 203. In this exemplifying case, each of the second inlets 206 and 207 comprises a tube protruding radially from the side wall of the mixing chamber 203 towards the center of the mixing chamber 203, wherein the tube has a closed end and a side wall of the tube has the openings for passing the second fluid tangentially into the spiral stream occurring in the mixing chamber 203.

The fluid mixer 101 comprises an outlet channel 208 that is substantially concentric to the mixing chamber 203 and conducts the first and second fluids downwards out from the mixing chamber 203. The outlet channel 208 comprises a mixing structure 209 that is located below the upper edge of the outlet channel 208 and that produces turbulence in a stream of the first and second fluids flowing in the outlet channel 208. In this exemplifying case, the mixing structure 209 is a stepwise reduction of the cross-sectional flow area of the outlet channel so that the stepwise reduction is located below the bottom of the mixing chamber 203. According to computer simulations, the stepwise reduction of the cross-sectional flow area improves the mixing effect so that the maximum local concentration of the second fluid is about 10% less than when using a corresponding fluid mixer without the stepwise reduction of the cross-sectional flow area in an exemplifying test case where the amount of the second fluid is about 15 weight-% of the mixture of the first and second fluids i.e. in ideal mixing the concentration of the second fluid would be about 15 weight-% all over the mixture.

Figure 3:
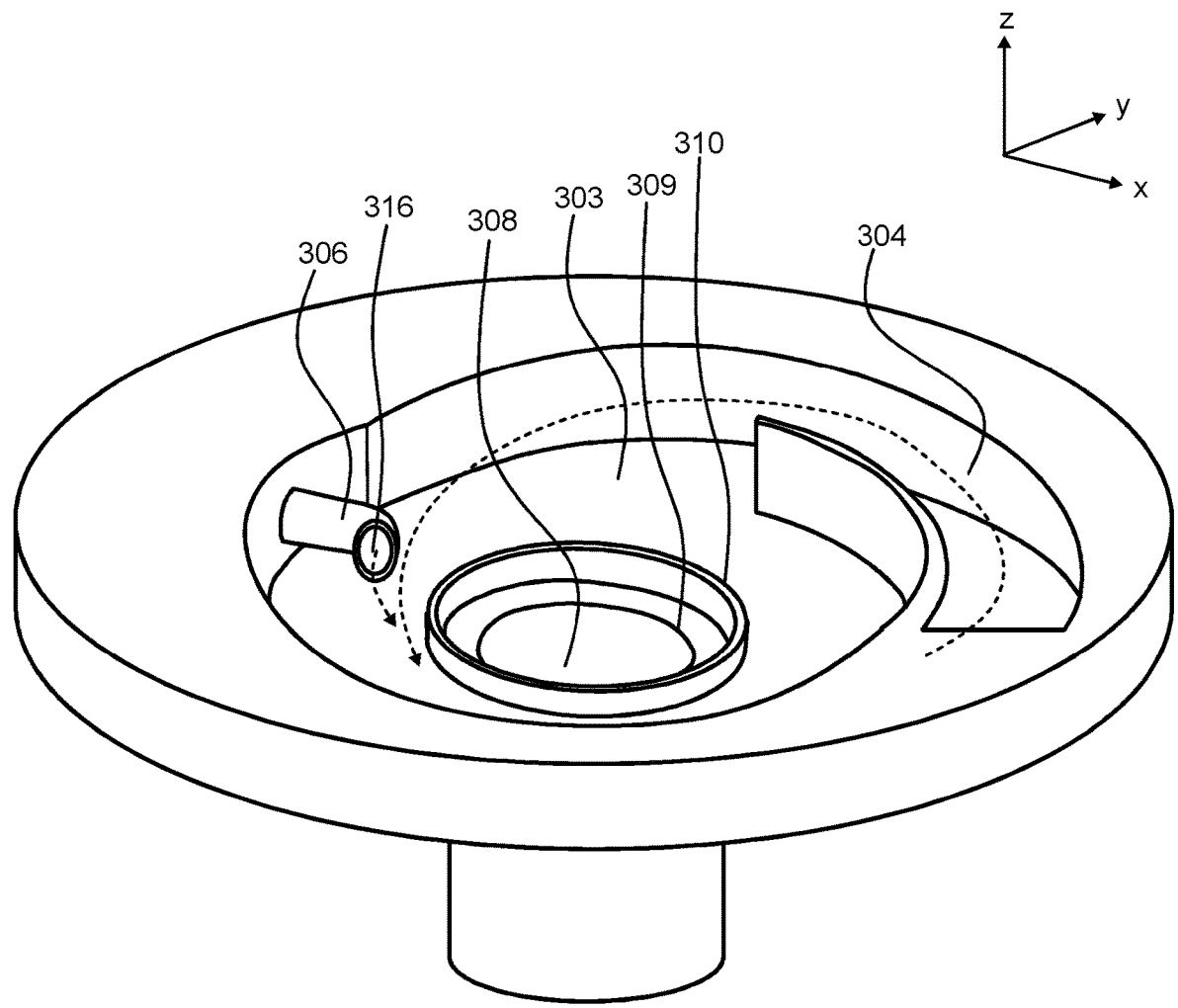
FIG. 3 illustrates a part of a fluid mixer according to an exemplifying and non-limiting embodiment.

FIG. 3 illustrates a part of a fluid mixer according to an exemplifying and non-limiting embodiment. The fluid mixer comprises a mixing chamber 303 and a first inlet 304 for conducting first fluid to the mixing chamber 303 from above the mixing chamber. The mixing chamber 303 is substantially cylindrical and the first inlet 304 is shaped to conduct the first fluid along a side wall of the mixing chamber 303 to produce a spiral stream in the mixing chamber 303. The fluid mixer comprises a second inlet 306 for conducting second fluid tangentially into the spiral stream. As shown in FIG. 3, an opening 316 of the second inlet 306 is a distance away from the side wall of the mixing chamber 303 to reduce concentration of the second fluid at the side wall of the mixing chamber 303. In this exemplifying case, the second inlet 306 comprises a tube protruding radially from the side wall of the mixing chamber 303 towards the center of the mixing chamber 303, wherein the tube is curved so that an end of the tube is tangential for passing the second fluid tangentially into the spiral stream occurring in the mixing chamber 303.

The fluid mixer comprises an outlet channel 308 that is substantially concentric to the mixing chamber 303 and conducts the first and second fluids downwards out from the mixing chamber 303. The outlet channel 308 comprises a mixing structure 309 that is located below the upper edge of the outlet channel 308 and that produces turbulence in a stream of the first and second fluids flowing in the outlet channel 308. In this exemplifying case, the mixing structure 309 is a stepwise reduction of the cross-sectional flow area of the outlet channel so that the stepwise reduction is located substantially in flush with the bottom of the mixing chamber 303. In this exemplifying case, the outlet channel 308 comprises a loop-shaped ridge 310 on the bottom of the mixing chamber 303. The loop-shaped ridge 310 constitutes an upper portion of the outlet channel 308 and thus the upper rim of the loop-shaped ridge 310 constitutes the upper edge of the outlet channel 308.

Figure 4A:
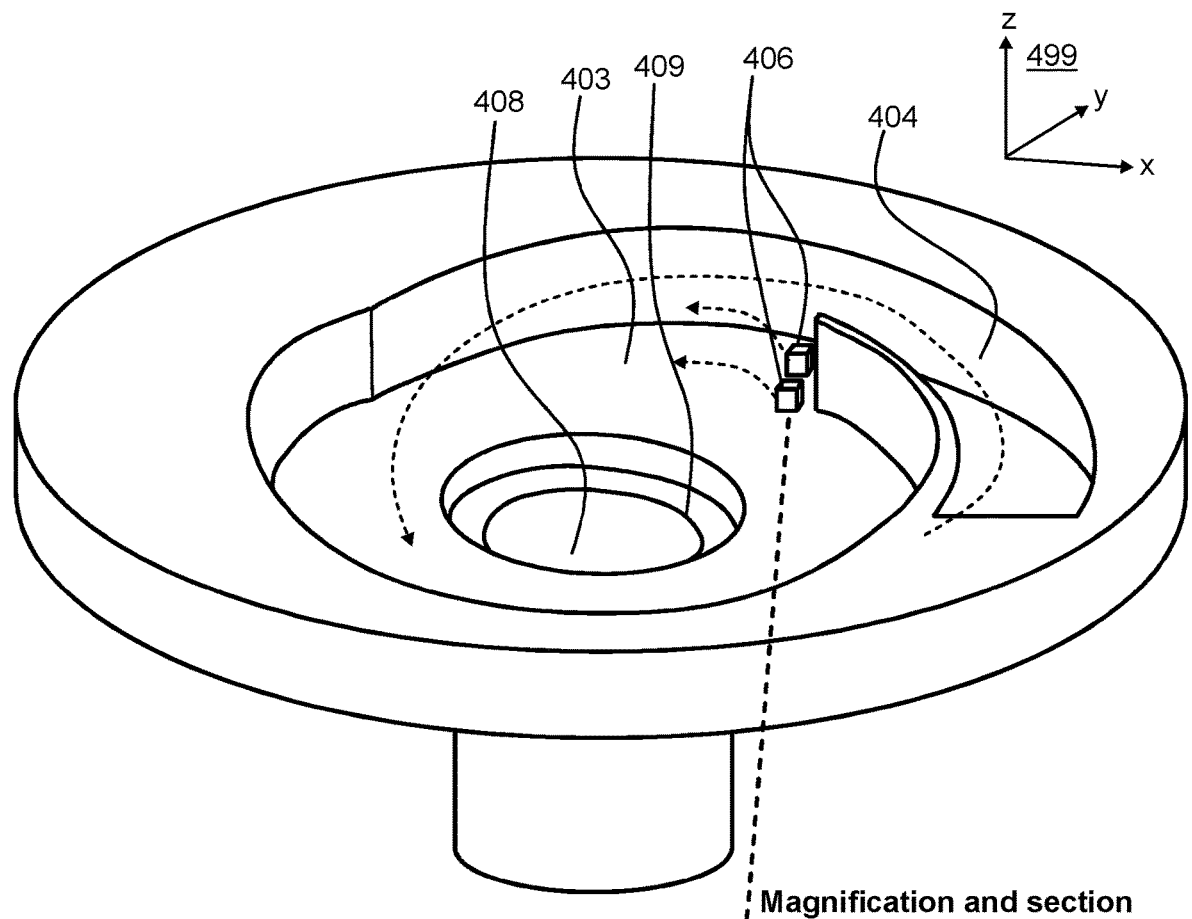
FIGS. 4a and 4b illustrate of a fluid mixer according to an exemplifying and non-limiting embodiment.
Figure 4B:
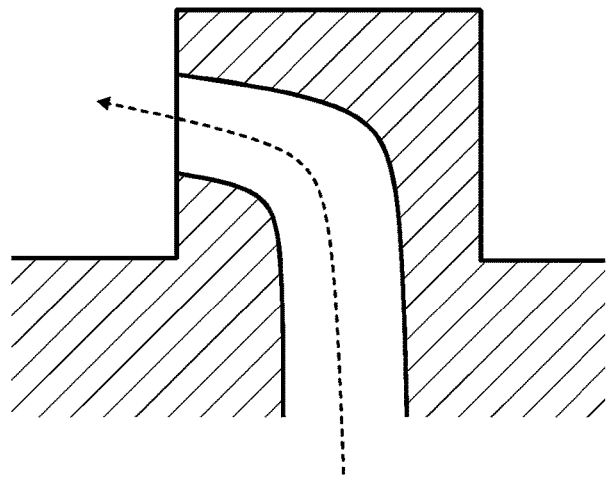

FIG. 4 illustrates a part of a fluid mixer according to an exemplifying and non-limiting embodiment. The fluid mixer comprises a mixing chamber 403 and a first inlet 404 for conducting first fluid to the mixing chamber 403 from above the mixing chamber 403. The mixing chamber 403 is substantially cylindrical and the first inlet 404 is shaped to conduct the first fluid along a side wall of the mixing chamber 403 to produce a spiral stream in the mixing chamber 403. The fluid mixer comprises a second inlet 406 for conducting second fluid tangentially into the spiral stream. In this exemplifying fluid mixer, the second inlet 406 comprises protrusions on the bottom of the mixing chamber 403. Each of the protrusions is provided with an opening for passing the second fluid tangentially into the spiral stream. In this exemplifying case, the protrusions are located at a place of the bottom of the mixing chamber 403 where the first inlet 404 joins the mixing chamber 403. FIG. 4 shows a magnified section view of one of the protrusions. The section plane is parallel with the xz-plane of a coordinate system 499.

The fluid mixer comprises an outlet channel 408 that is substantially concentric to the mixing chamber 403 and conducts the first and second fluids downwards out from the mixing chamber 403. The outlet channel 408 comprises a mixing structure 409 that is located below the upper edge of the outlet channel and that produces turbulence in a stream of the first and second fluids flowing in the outlet channel 408. In this exemplifying case, the outlet channel 408 is like the outlet channel 208 of the fluid mixer 101 shown in FIGS. 2a and 2b.

In the exemplifying fluid mixers illustrated in FIGS. 2a, 2b, 3, and 4, the outlet channels are substantially circularly symmetric with respect to a vertical geometric line. It is however also possible that an outlet channel of a fluid mixer according to an exemplifying and non-limiting embodiment has a non-circular cross-sectional shape, e.g. oval, polygon, etc. In the exemplifying fluid mixers illustrated in FIGS. 2a, 2b, 3, and 4, each first inlet is shaped to descend to the mixing chamber in a form of a curved ramp. It is however also possible that each first inlet of a fluid mixer according to an exemplifying and non-limiting embodiment is implemented with a curved tube for producing a spiral stream in a mixing chamber. The exemplifying fluid mixer illustrated in FIGS. 2a and 2b comprises two first inlets and two second inlets, whereas the exemplifying fluid mixer illustrated in FIG. 3 comprises one first inlet and one second inlet. It is also possible that a fluid mixer according to an exemplifying and non-limiting embodiment comprises three or more first inlets and/or three of more second inlets.

Figure 5A:
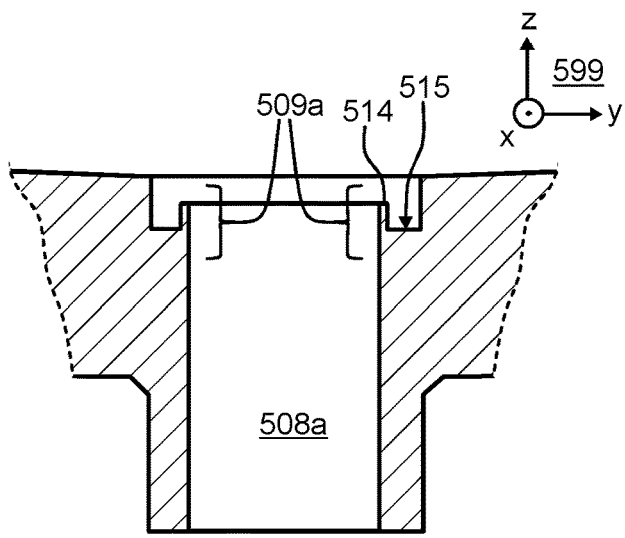
FIGS. 5a, 5b, and 5c illustrate details of fluid mixers according to exemplifying and non-limiting embodiments.
Figure 5B:
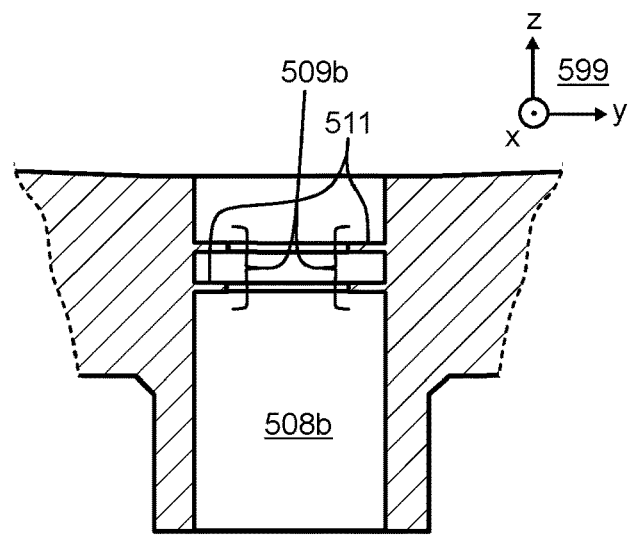
Figure 5C:
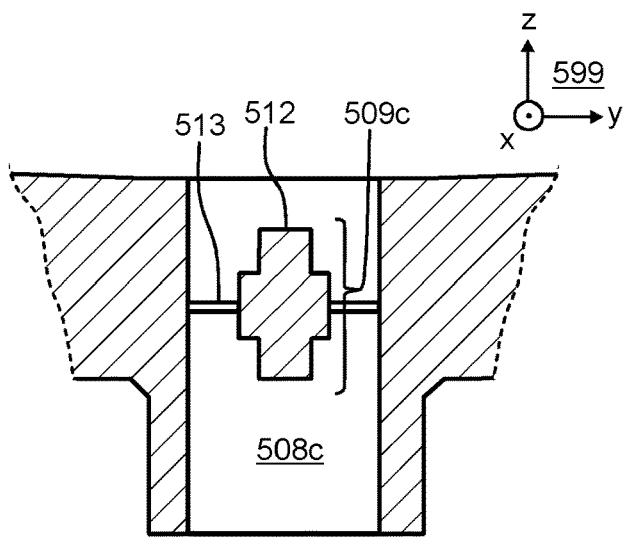

FIGS. 5a, 5b, and 5c show section views of outlet channels of fluid mixers according to exemplifying and non-limiting embodiments. The section plane is parallel with the yz-plane of a coordinate system 599. FIG. 5a shows an outlet channel 508a that comprises a mixing structure 509a that is located below the upper edge of the outlet channel 508a and produces turbulence in a stream of fluids flowing in the outlet channel 508a. The mixing structure 509a comprises a loop-shaped mixing ridge 514 on an upwards facing surface 515 of the outlet channel 508a, where the upwards facing surface 515 implements a stepwise reduction of the cross-sectional flow area of the outlet channel 508a. FIG. 5b shows an outlet channel 508b that comprises a mixing structure 509b that is located below the upper edge of the outlet channel 508b and produces turbulence in a stream of fluids flowing in the outlet channel 508b. The mixing structure 509b comprises loop-shaped mixing ridges 511 on a vertical surface of the outlet channel 508b. The loop-shaped mixing ridges 511 implement two stepwise reductions and two stepwise expansions of the cross-sectional flow area of the outlet channel 508b. FIG. 5c shows an outlet channel 508c that comprises a mixing structure 509c that produces turbulence in a stream of fluids flowing in the outlet channel 508c. The mixing structure 509c comprises a mixing element 512 mechanically supported inside the outlet channel 508c and implementing at least one stepwise reduction of the cross-sectional flow area of the outlet channel 508c. In this exemplifying case, the mixing element 512 is located below the upper edge of the outlet channel 508c. It is however also possible that only a part of the mixing element is below the upper edge of the outlet channel 508c. As shown in FIG. 5c, there are bar-shaped support elements in the outlet channel 508c so that the support elements mechanically support the mixing element 512. One of the support elements is denoted with a reference 513. The support elements may also improve the mixing.

It is to be noted that the above-presented mixing structures are non-limiting examples only, and many different mechanical shapes and arrangements can be used for producing turbulence in a stream of fluids flowing in an outlet channel of a fluid mixer. For example, it is possible to implement a combination of one or more of the above-presented mixing structures.

Figure 6:
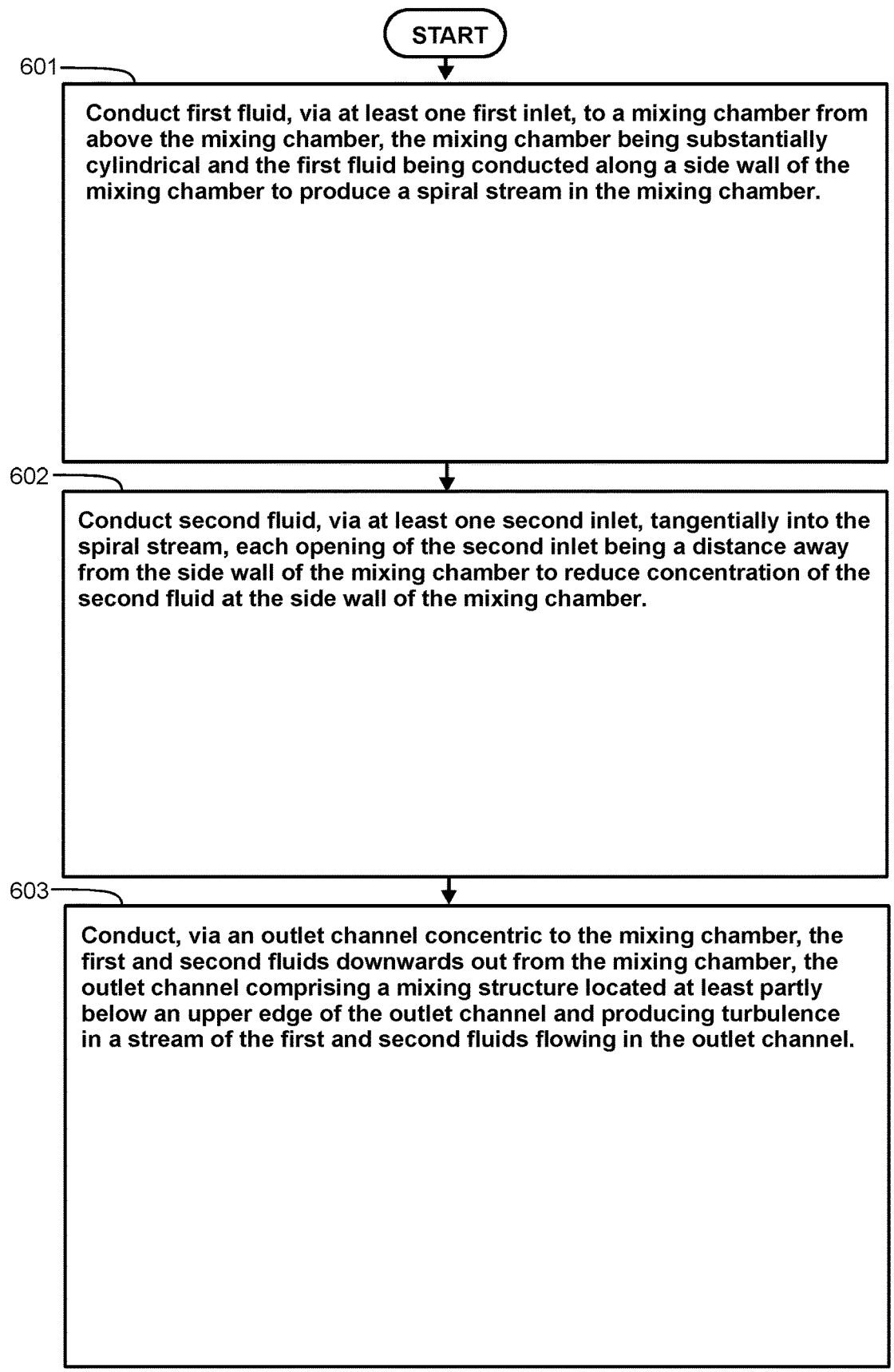
FIG. 6 shows a flowchart of a method according to an exemplifying and non-limiting embodiment for mixing fluids in a reactor of a hydrocarbon processing plant.

FIG. 6 shows a flowchart of a method according to an exemplifying and non-limiting embodiment for mixing fluids in a reactor of a hydrocarbon processing plant. The method comprises:

- action 601: conducting first fluid, via at least one first inlet, to a mixing chamber from above the mixing chamber, the mixing chamber being substantially cylindrical and the first fluid being conducted along a side wall of the mixing chamber to produce a spiral stream in the mixing chamber,
- action 602: conducting second fluid, via at least one second inlet, tangentially into the spiral stream, each opening of the second inlet being a distance away from the side wall of the mixing chamber to reduce concentration of the second fluid at the side wall of the mixing chamber, and
- action 603: conducting, via an outlet channel concentric to the mixing chamber, the first and second fluids downwards out from the mixing chamber, wherein the outlet channel comprises a mixing structure located at least partly below the upper edge of the outlet channel and producing turbulence in a stream of the first and second fluids flowing in the outlet channel.

In a method according to an exemplifying and non-limiting embodiment, the first fluid flows to the mixing chamber from a bottom of a first catalytic bed of the reactor and a mixture of the first and second fluids is conducted to a top of a second catalytic bed of the reactor. In an exemplifying case where the reactor comprises three or more catalytic beds, the above-mentioned first and second catalytic beds can be any two successive catalytic beds of the reactor. Furthermore, the method can be carried out between each successive two of the catalytic beds.

In a method according to an exemplifying and non-limiting embodiment, the mixing structure is located below the bottom of the mixing chamber.

In a method according to an exemplifying and non-limiting embodiment, the mixing structure implements one or more stepwise reductions of the cross-sectional flow area of the outlet channel.

In a method according to an exemplifying and non-limiting embodiment, a wall of the outlet channel is shaped to implement at least one stepwise reduction of the cross-sectional flow area of the outlet channel.

In a method according to an exemplifying and non-limiting embodiment, the mixing structure comprises a loop-shaped mixing ridge on an upwards facing surface of the outlet channel, where the upwards facing surface implements a stepwise reduction of the cross-sectional flow area of the outlet channel.

In a method according to an exemplifying and non-limiting embodiment, the mixing structure comprises a mixing element mechanically supported inside the outlet channel and implementing at least one stepwise reduction of the cross-sectional flow area of the outlet channel.

In a method according to an exemplifying and non-limiting embodiment, the outlet channel comprises a loop-shaped ridge on the bottom of the mixing chamber, where the loop-shaped ridge constitutes an upper portion of the outlet channel and the upper rim of the loop-shaped ridge constitutes the upper edge of the outlet channel.

In a method according to an exemplifying and non-limiting embodiment, the outlet channel is substantially circularly symmetric with respect to a vertical geometric line.

In a method according to an exemplifying and non-limiting embodiment, the first inlet is shaped to descend to the mixing chamber in a form of a curved ramp.

In a method according to an exemplifying and non-limiting embodiment, the second inlet comprises a tube protruding radially from the side wall of the mixing chamber towards the center of the mixing chamber and having one or more openings for passing the second fluid tangentially into the spiral stream. The tube can be for example curved so that an end of the tube is tangential for passing the second fluid tangentially into the spiral stream. For another example, the tube can have a closed end and a side wall of the tube can have one or more openings for passing the second fluid tangentially into the spiral stream.

In a method according to an exemplifying and non-limiting embodiment, the second inlet comprises one or more protrusions located on the bottom of the mixing chamber and each being provided with an opening for passing the second fluid tangentially into the spiral stream. The one or more protrusions can be located for example at a place of the bottom of the mixing chamber where the first inlet joins the mixing chamber.

In a method according to an exemplifying and non-limiting embodiment, the first inlet is one of at least two first inlets placed substantially equidistantly on the periphery of the mixing chamber.

In a method according to an exemplifying and non-limiting embodiment, the second inlet is one of at least two second inlets placed substantially equidistantly on the periphery of the mixing chamber.

The specific examples provided in the description given above should not be construed as limiting. Therefore, the invention is not limited merely to the exemplifying and non-limiting embodiments described above. Lists and groups of examples provided in the description are not exhaustive unless otherwise explicitly stated.

What is claimed is:

1. A fluid mixer comprising:
    - a frame structure defining a mixing chamber and at least one first inlet configured for conducting a first fluid to the mixing chamber from above the mixing chamber, the mixing chamber being substantially cylindrical, and the at least one first inlet being shaped to conduct the first fluid along a side wall of the mixing chamber to produce a spiral stream in the mixing chamber;
    - at least one second inlet configured for conducting a second fluid tangentially into the spiral stream, wherein the at least one second inlet has one or more openings inside the mixing chamber and the one or more openings are a distance away from the side wall of the mixing chamber to reduce concentration of the second fluid at the side wall of the mixing chamber; and an outlet channel configured for conducting the first and second fluids downwards out from the mixing chamber, the outlet channel being concentric to the mixing chamber,
wherein the outlet channel includes a mixing structure configured for producing turbulence in a stream of the first and second fluids when flowing in the outlet channel, at least a part of the mixing structure being located below an upper edge of the outlet channel, wherein a tubular wall of the outlet channel is shaped to implement at least one stepwise reduction of a cross-sectional flow area of the outlet channel, the mixing structure being the stepwise reduction of the cross-sectional flow area of the outlet channel, and the tubular wall constituting an outmost surface of the outlet channel and being configured to be in contact with the first and second fluids when conducted downwards by the outlet channel.

2. The fluid mixer according to claim 1, wherein the mixing structure is located below a bottom of the mixing chamber.

3. The fluid mixer according to claim 1, wherein the mixing structure comprises:
a loop-shaped mixing ridge on an upwards facing surface of the outlet channel, the upwards facing surface being configured implementing the stepwise reduction of the cross-sectional flow area of the outlet channel.

4. The fluid mixer according to claim 1, wherein the mixing structure comprises:
a mixing element mechanically supported inside the outlet channel and shaped to produce turbulence in the stream of the first and second fluids flowing in the outlet channel.

5. The fluid mixer according to claim 1, wherein the outlet channel comprises:
a loop-shaped ridge on a bottom of the mixing chamber, the loop-shaped ridge constituting an upper portion of the outlet channel, and an upper rim of the loop-shaped ridge constituting the upper edge of the outlet channel.

6. The fluid mixer according to claim 1, wherein the outlet channel is substantially circularly symmetric with respect to a vertical geometric line.

7. The fluid mixer according to claim 1, wherein the at least one first inlet is shaped to descend to the mixing chamber in a form of a curved ramp.

8. The fluid mixer according to claim 1, wherein the at least one second inlet comprises:
a tube protruding radially from the side wall of the mixing chamber towards a center of the mixing chamber and having one or more openings configured for passing the second fluid tangentially into the spiral stream.

9. The fluid mixer according to claim 8, wherein the tube is curved so that an end of the tube is tangential for passing the second fluid tangentially into the spiral stream.

10. The fluid mixer according to claim 8, wherein the tube has a closed end, and a side wall of the tube has the one or more openings for passing the second fluid tangentially into the spiral stream.

11. The fluid mixer according to claim 1, wherein the at least one second inlet comprises:
one or more protrusions located on a bottom of the mixing chamber, each being provided with an opening configured for passing the second fluid tangentially into the spiral stream.

12. The fluid mixer according to claim 11, wherein the one or more protrusions are located at a place of the bottom of the mixing chamber where the at least one first inlet is configured to join the mixing chamber.

13. The fluid mixer according to claim 1, wherein the at least one first inlet is one of at least two first inlets placed substantially equidistantly on a periphery of the mixing chamber.

14. The fluid mixer according to claim 1, wherein the second inlet is one of at least two second inlets placed substantially equidistantly on a periphery of the mixing chamber.

15. A reactor for a hydrocarbon processing plant, the reactor comprising:
a reactor vessel;
catalytic beds inside the reactor vessel; and
at least one fluid mixer inside the reactor vessel and between successive ones of the catalytic beds
wherein the at least one fluid mixer includes:
a frame structure defining a mixing chamber and at least one first inlet for conducting first fluid to the mixing chamber from above the mixing chamber, the mixing chamber being substantially cylindrical, and the at least one first inlet being shaped to conduct the first fluid along a side wall of the mixing chamber to produce a spiral stream in the mixing chamber;
at least one second inlet for conducting second fluid tangentially into the spiral stream, each opening of the at least one second inlet being inside the mixing chamber and a distance away from the side wall of the mixing chamber to reduce concentration of the second fluid at the side wall of the mixing chamber; and
an outlet channel for conducting the first and second fluids downwards out from the mixing chamber, the outlet channel being concentric to the mixing chamber and the outlet channel including a mixing structure for producing turbulence in a stream of the first and second fluids flowing in the outlet channel, at least a part of the mixing structure being located below an upper edge of the outlet channel, wherein a wall of the outlet channel is shaped to implement at least one stepwise reduction of a cross-sectional flow area of the outlet channel, the mixing structure being the stepwise reduction of the cross-sectional flow area of the outlet channel, and the tubular wall constituting an outmost surface of the outlet channel and being configured to be in contact with the first and second fluids when conducted downwards by the outlet channel.

16. The reactor according to claim 15, wherein the reactor is a hydrodeoxygenation reactor.

17. A method for mixing fluids in a reactor comprising:
conducting a first fluid, via at least one first inlet, to a mixing chamber from above the mixing chamber, the mixing chamber being substantially cylindrical and the first fluid being conducted along a side wall of the mixing chamber to produce a spiral stream in the mixing chamber;
conducting a second fluid, via at least one second inlet, tangentially into the spiral stream, each opening of the at least one second inlet being inside the mixing chamber and a distance away from the side wall of the mixing chamber to reduce concentration of the second fluid at the side wall of the mixing chamber; and
conducting, via an outlet channel concentric to the mixing chamber, the first and second fluids downwards out from the mixing chamber
wherein the outlet channel includes a mixing structure located at least partly below an upper edge of the outlet channel and producing turbulence in a stream of the first and second fluids flowing in the outlet channel, wherein a wall of the outlet channel is shaped to implement at least one stepwise reduction of a cross-sectional flow area of the outlet channel, the mixing structure being the stepwise reduction of the cross-sectional flow area of the outlet channel, and the tubular wall constituting an outmost surface of the outlet channel and being configured to be in contact with the first and second fluids conducted downwards by the outlet channel.

18. The method according to claim 17, comprising:
conducting the first fluid to the mixing chamber from a bottom of a first catalytic bed of the reactor, and conducting a mixture of the first and second fluids to a top of a second catalytic bed of the reactor.

\* \* \* \* \*